INVENTORS
EDWARD K. DOMBECK
MURL HINKLE.
DELOS B. THOMAS
BY John A. Young
ATTORNEY.

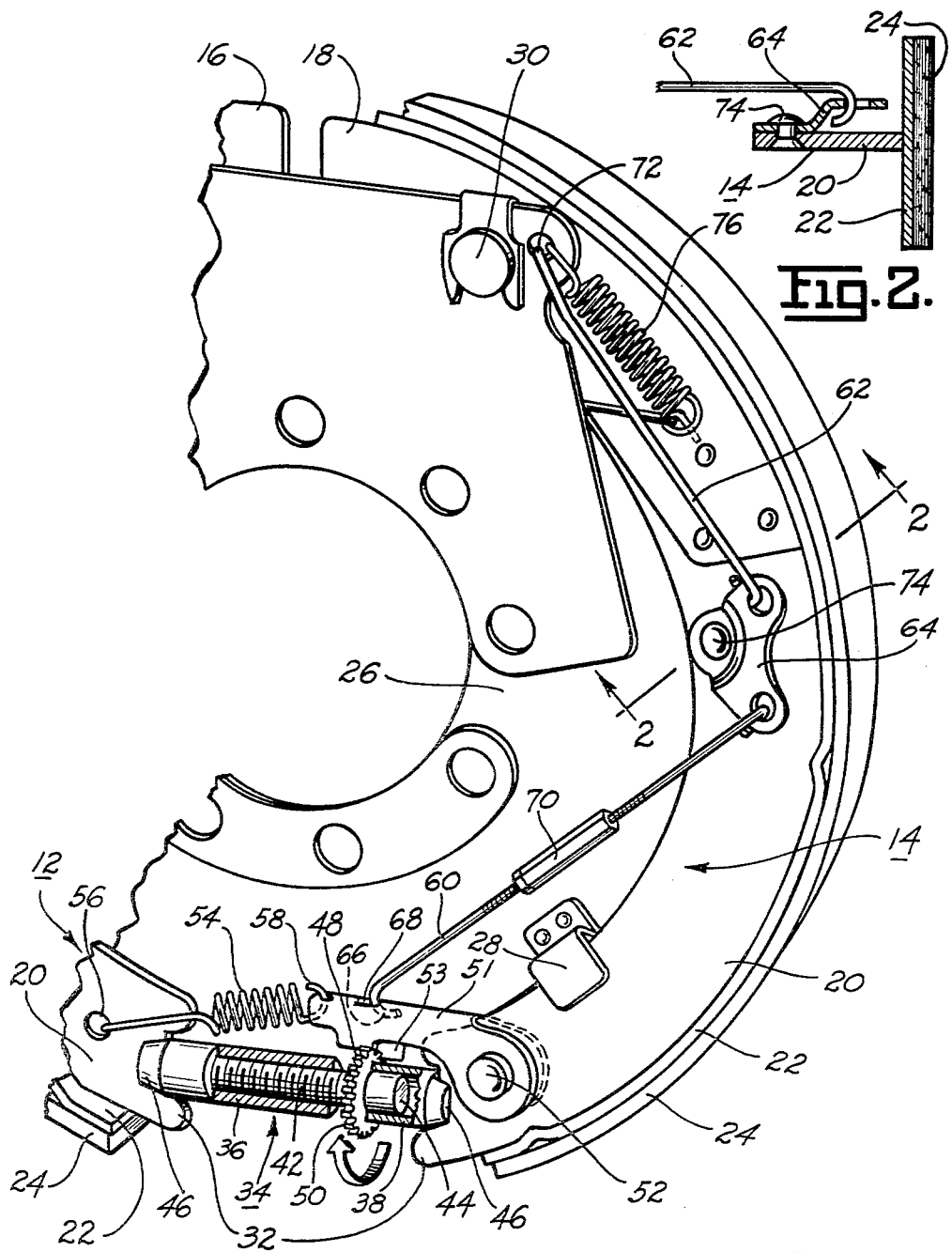

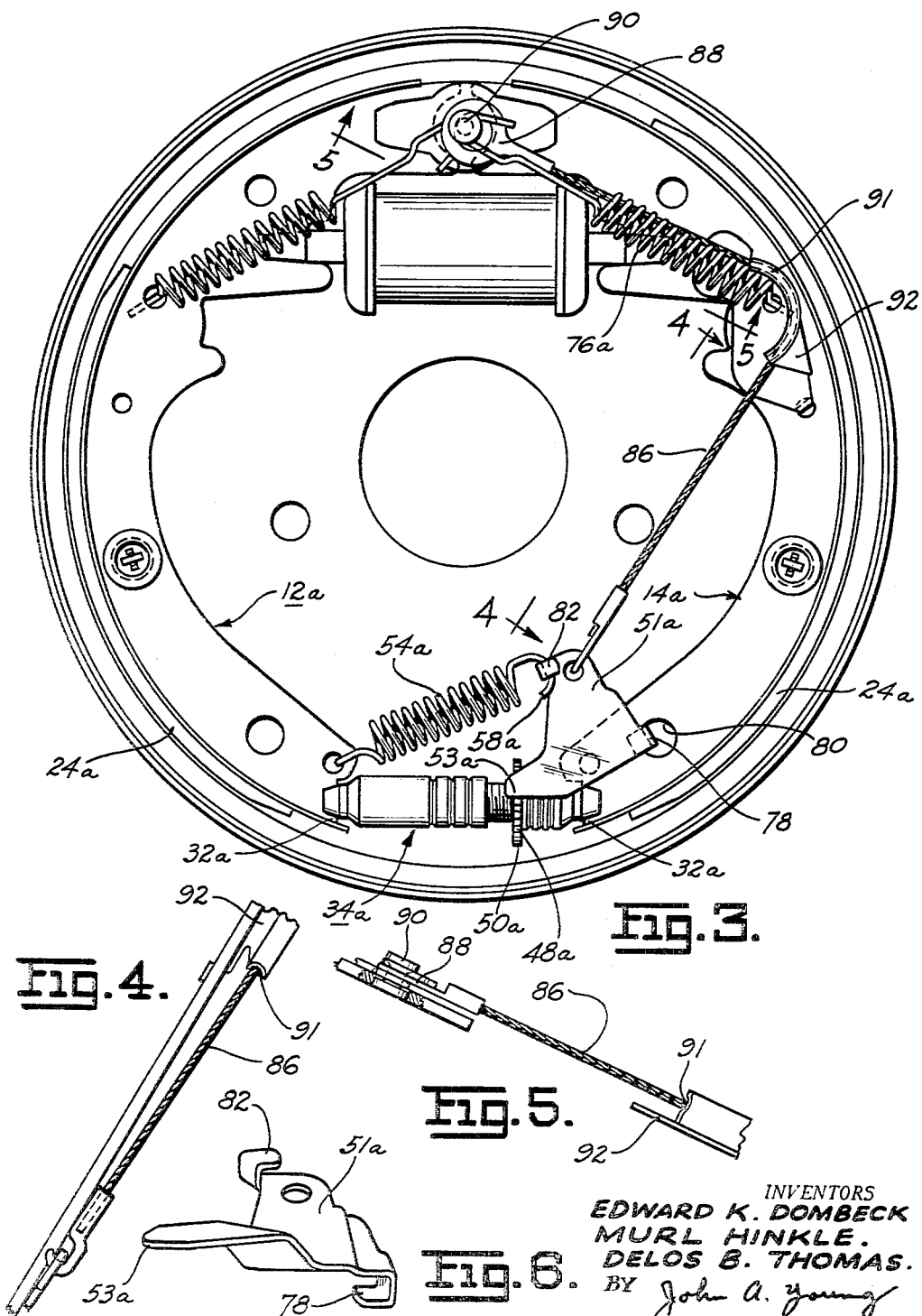

United States Patent Office 2,938,610
Patented May 31, 1960

2,938,610
AUTOMATIC ADJUSTER

Edward K. Dombeck, Murl Hinkle, and Delos B. Thomas, South Bend, Ind., assignors to Bendix Aviation Corporation, South Bend, Ind., a corporation of Delaware Filed Aug. 8, 1956, Ser. No. 602,866

9 Claims. (Cl. 188—79.5)

This invention relates to an automatic adjuster for arcuate brake shoes and in the embodiments selected for explanation of the invention, the brake shoes are of the "servo" type in which one brake shoe is used to apply the other. It will be apparent, however, that the invention is not restricted to this particular arrangement of the brake shoes.

It is an object of the invention to provide automatic adjustment for the brake shoes, responsively to wear thereof, at a very nominal cost.

There have been numerous proposed automatic adjusters for vehicle brakes which have proved unsatisfactory either because of inherent operational deficiencies or because of prohibitive cost. Among the operational deficiencies which we have found objectionable is that a part of the braking stress is imposed on the adjuster mechanism, thus making the adjuster prone to failure. In other instances, the adjuster has involved the use of feeler gauges and this has caused scoring of the brake drum.

We propose an automatic adjuster which is reduced in the number of component parts to approach an ultimate in structural simplicity. It is further provided that the automatic adjuster will operate only during reverse braking so that an adjustment which is rendered takes place when the brake is not overheated and thus the adjustment is accurate in amount.

The structural simplicity of the automatic adjuster creates an economy in manufacture. Another important item of cost is the price of installation and maintenance. It forms an important part of the invention that the adjuster can be installed with minimum difficulty and easily lends itself to various size brakes. Cumulative brake manufacturing tolerances do not affect installation of the adjuster; thus, there are no refined construction details which must be accounted for in equipping the brake with our invention.

It is another important feature of the invention that the brakes can be manually as well as automatically adjusted so that when the brake shoes are to be discarded, the adjuster can be manually reset to accommodate the replacement shoes.

It will be noted from the description of the invention that the parts of the adjuster are made mostly from stampings and this enables an inherent cost advantage in making the adjuster. Also, only a relatively few number of parts are involved in the adjuster and the parts are so located that the adjuster can be installed on a brake which is not especially made or originally adapted for the invention.

Other objects and features of the invention will become apparent from the following description which proceeds with reference to the accompanying drawings, wherein:

Figure 1 is an isometric view of a tractor brake (with a portion of the one shoe broken away) shown with the automatic adjuster with a portion broken away;

Figure 2 is a section view taken on line 2—2 of Figure 1;

Figure 3 is a plan view of a brake having a second embodiment of the automatic adjuster invention;

Figure 7:
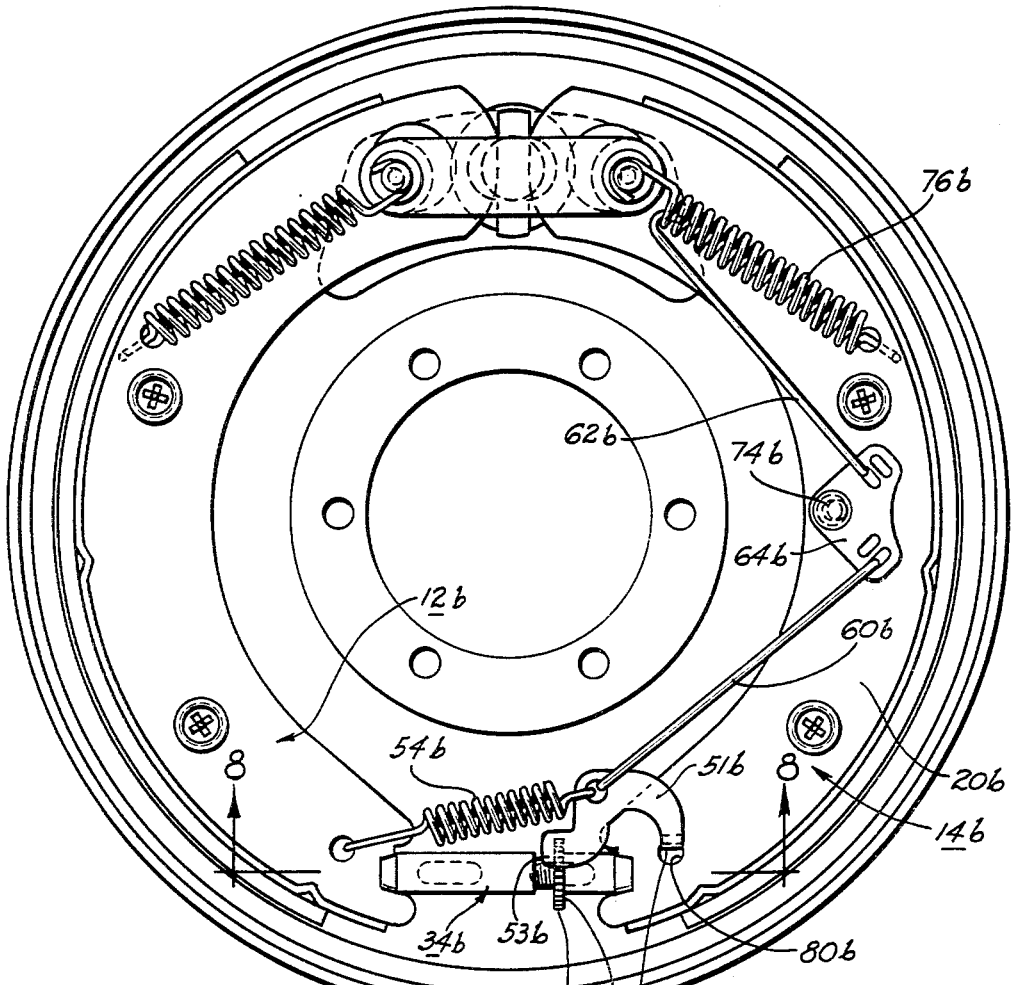
Figure 8:
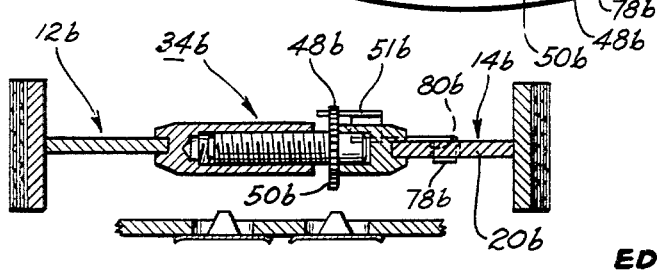

Figures 4 and 5 are section views taken on lines 4—4 and 5—5, respectively, of Figure 3;

Figure 6 is an isometric detail view of the adjuster lever shown in Figure 3;

Figure 7 is a plan view of a brake incorporating a further embodiment of the invention; and Figure 8 is a section view taken on line 8—8 of Figure 7.

Referring first to the embodiment shown in Figures 1 through 4, the primary brake shoe 12 and secondary brake shoe 14 are mechanically applied in any suitable manner by means of a cam or the like (not shown) which acts against expansible ends 16 and 18 of the brake shoes. Each of the brake shoes is identically constructed and consists of a web 20, rim 22, and friction lining 24. The shoes are held against a backing plate 26 by means of hold down fingers 28 (only one of which is shown).

Both shoes anchor together as a unit at one or the other of the expansible ends 16 or 18 depending upon the direction of drum rotation. For example, when the drum is rotating in a counterclockwise direction, the two shoes 12 and 14 anchor on anchor 30 which is provided at the end of shoe 14. In this direction of braking, the brake shoe 12 is referred to as the "primary shoe" and shoe 14 acts as the "secondary shoe."

Between the articulated ends 32 of brake shoes 12 and 14 is an adjustable strut designated generally by reference numeral 34. The adjustable strut comprises a tubular internally threaded nut 36 and a socket 38 which receive threaded stem 42 and nonthreaded stem 44, respectively. The ends 46 of nut 36 and socket 38 are slotted to receive ends 32 of the brake shoes, thus preventing rotation of nut 36 and socket 38. A star wheel 48 is formed integrally with stems 42 and 44, and the irregularly shaped periphery 50 of the star wheel provides a ratchet surface for turning the wheel 48.

A lever 51, functioning as a pawl, has a pinned connection 52 with the end 32 of secondary brake shoe 14. It will be noted that the lever is doubled over to extend on each side of the web 20 of the secondary shoe 14. The lever 51 has a detent or tooth 53 which engages the periphery 50 of star wheel 48. A coil spring 54 (Figure 1) is fastened at one end 56 to the primary shoe 12 and at the other end 58 to the lever 51. The free end of the lever 51 is biased by the spring 54 in a downward direction to rotate the star wheel in the direction of the arrow in Figure 1. The coil spring 54 serves a number of functions; it is so positioned that the spring load which is developed by tensioning thereof exerts a circumferential component force holding ends 32 of the primary and secondary shoes against the adjustable strut 34; the coil spring 54 further develops a radial component force serving to swing the lever 51 downwardly to thereby turn the serrated wheel 48, and the coil spring 54 develops a lateral force on the lever 51 so that the tooth 53 remains in engagement with the serrated periphery 50 of the star wheel while the lever turns on pivot 52.

The lever 51 can be caused to turn on pivot 52 by rods 60 and 62 which are connected to a bell crank lever 64. Rod 60 has a hook 66 which is passed through a slot 68 in lever 51 for connection therewith, and is connected at the other end thereof to bell crank 64. A turnbuckle 70 is used to vary the length of rod 60 to compensate for brake manufacturing tolerances. The rod 62 is hooked at end 72 to a stationary part of the brake adjacent anchor 30 and is secured at the other end to the bell crank lever 64. The bell crank is pinned or otherwise suitably secured at 74 to the web 20 of the secondary brake shoe 14. The bell crank is free to turn on pinned connection 74.

A return spring 76 is used to hold the expansible end 18 of the secondary brake shoe in a normally retracted position which is defined by its engagement with anchor 30.

An adjustment of the brake takes place when the vehicle is moving in reverse direction, this being accompanied by clockwise rotation of the drum. Assuming that the lining 24 has worn sufficiently to require an adjustment, and the vehicle is moving reversely, an application of the brakes will be accompanied by an adjustment which takes place in the following manner:

The normally primary shoe 12 becomes the anchored shoe and the secondary shoe 14 is moved away from anchor 30. Circumferential movement of the secondary shoe away from the anchor 30 displaces the pivot 74 of bell crank lever 64. This displacement of the pivot 74 in a circumferential direction causes a turning of the bell crank 64 by rod 62 in a counterclockwise direction. Rod 60 is thus pulled by the bell crank lever and lever 51 is caused to turn in a clockwise direction about pivot 52 against the resistance of spring 54. When the lever 51 is thus moved, the detent or tooth 53 moves upwardly and engages a successive indentation on the periphery 50 of the star wheel 48. When the brake is released, the return spring 76 retracts secondary brake shoe 14, causing it to re-engage anchor 30 and thereby relieve the turning force exerted on lever 51 by rods 60 and 62. The spring 54 thereupon rotates the lever 51 in a counterclockwise direction about pivot 52 bringing the detent 53 downwardly to rotate the serrated wheel 48 in the direction indicated by the arrow in Figure 1. Rotation of the star wheel 48 in the direction indicated by the arrow forces the sleeves 36 and 28 apart and spreads the articulated ends 32 of the shoes. From the location of the spring 54 it will be apparent that the ends 32 of the shoes are held in tight engagement with the strut 34 throughout the adjusting cycle. The spring 54 is also positioned so that the tooth 53 is biased laterally against the periphery of the serrated wheel 50 while the detent 53 is being moved relatively to the periphery 50 and this biasing force further insures that movement of the detent downwardly (Figure 1) will in each instance produce rotation of the serrated wheel 48. Adjustment which takes place in the manner described is by definite increments and there is no possibility of overadjustment of the shoes because of excessive heating of the brake since adjustment takes place only during reverse vehicle movement.

The adjuster operation and construction has been explained with reference to the left rear vehicle wheel brake. For the right rear wheel, reverse rotation produces counterclockwise rotation of the drum. The adjuster lever is pivoted on the lower end of the left hand shoe and the adjuster strut is turned 180°. The same adjuster lever can be used for both right rear and left rear brakes. On the right rear wheel, the adjuster tooth 53 engages the side of the star wheel toward the viewer. The only change in adjuster mechanism is that the threads of the adjuster nut 36 and stem 42 are made left hand instead of right hand.

Referring next to the embodiment shown in Figures 3 through 6, parts of the adjuster corresponding to those previously described will be referred to by the same reference numeral with a subscript "a." Extendable strut 34a is secured between the articulated ends 32a of primary shoe 12a and secondary shoe 14a. Lever 51a has a tab 78 (Figures 3, 6) which is received through an opening 80 in the secondary shoe to provide a pivot for lever 51a. Tooth 53a of the lever engages the serrated periphery 50a of star wheel 48a. Rotation of the star wheel produces extension of the strut 34a as in the previous embodiment.

Coil spring 54a is stretched between end 32a of the primary shoe 12a and a turned up portion 82 of the lever which receives hooked end 58a of coil spring 54a. The spring 54a tends to turn the lever 51a in a counterclockwise direction to displace the detent 53a downwardly and thereby rotate the serrated wheel 48a to adjustably spread the articulated ends 32a of the shoes. The coil spring 54a is further arranged so that it will exert a lateral force on the tooth 53a bringing it forcibly against the periphery of the serrated wheel. A further function of the coil spring 54a is to hold the articulated ends 32a of the shoes against strut 34a.

A flexible cable 86 is secured at one end to lever 51a and has a grommet 88 at the other end which fits over anchor 90. Intermediate the ends of the flexible cable it is passed over a channel shaped groove 91 of a stamping 92 which is securely held against the web 20a of the secondary brake shoe 14a.

An adjustment takes place when the vehicle is moving reversely with the drum rotating in a clockwise direction. Assuming that the lining 24a has worn sufficiently to require an adjustment, the secondary brake shoe 14a will move from the anchor to produce a tensioning of cable 86. When the groove 91 slides circumferentially in a counterclockwise direction, the end of the cable attached to the lever 51a is pulled upwardly and lever 51a is thereby rotated clockwise about opening 80. The detent 53a is moved upwardly and into engagement with a successive indentation of the star wheel 48a; thus, when the brake is released and the secondary shoe 14a returns to its anchored position, the cable 86 is relaxed and spring 54a turns the lever 51a in a counterclockwise direction to move detent 53a downwardly and rotate star wheel 48a. This rotation of the star wheel 48a in the manner described, extends the strut 34a to move the brake shoes closer to the drum and reduce clearance between the lining 24a and engageable drum surface. Because the adjustment takes place by definite increments, it is not possible to overadjust the brakes, and because the adjustment takes place with the vehicle moving in a reverse direction, it is not possible to effect an erroneous adjustment during an overheated condition of the brake.

Referring next to the embodiment shown in Figures 7 and 8, parts corresponding to those in the previous embodiments will receive the same reference numeral with the subscript "b."

Rod 62b is hooked at one end to return spring 76b and at the other end to bell crank 64b. The rod 60b is hooked to bell crank 64b at one end and at the other end to adjuster lever 51b. The bell crank has an eccentric pivot attachment 74b to the web 20b of shoe 14b. The eccentric attachment 74b is turned so that rods 60b and 62b are held taut. This operation provides compensation for cumulative manufacturing tolerances, thus simplifying installation of the adjuster. The adjuster may be thus readily installed on production brakes where distances from anchored to articulated ends of the shoes will vary according to the aforementioned manufacturing tolerances.

The adjuster lever 51b has a turned over tab 78b which is received in opening 80b of the web 20b and pivots thereon. The tooth 53b of lever 51b engages the serrated periphery 50b of star wheel 48b which is a part of adjuster 34b. Spring 54b holds the articulated ends of the shoes 12b and 14b against the adjuster, biases the tooth 53b in a direction tending to rotate the star wheel 48b, and holds the tooth 53b tightly against the start wheel periphery 50b. The adjuster functions substantially identically to the previous embodiments.

Although only three selected embodiments of the invention have been chosen to illustrate the invention, it will be apparent to those skilled in the art that the principles of the invention are broad in scope and are capable of general application. For example, it is not necessary that use of the adjuster be restricted to a "servo"

type brake. It is also possible that the adjusted can be used with a non-servo brake in which the ends of the brake shoes are not connected but are anchored. Other revisions will readily occur to those skilled in the art and it is to be reasonably expected that such revisions will be included within the scope of the following claims.

We claim:

1. In a brake having a primary and secondary brake shoe, an extendible force-transmitting member interconnecting adjacent ends of said shoes, a rotatable star wheel which controls extension and contraction of said force-transmitting member, a lever member pivotally supported on the secondary shoe adjacent said force-transmitting member, a tooth portion of said lever engageable with the notched periphery of said star wheel, a coil spring which is fastened at one end to the primary shoe and at the other end to said lever thereby causing the lever to turn and thus rotate said star wheel, a bell crank pivotally mounted on said secondary shoe intermediate the ends thereof, a first rod fastened between the free end of said lever and said bell crank, and a second rod fastened between said rod and a stationary part of the brake at the anchoring end of said secondary shoe whereby movement of said secondary shoe away from an anchoring position produces rotation of said bell crank and displacement of the toothed portion of said lever to engage a successive notched portion of said star wheel, said spring serving to return the lever to its original position when the secondary shoe is retracted to thereby adjustably spread the articulated ends of said primary and secondary brake shoes.

2. In a brake, a pair of brake shoes, and an extendible strut connecting adjacent ends of said shoes, a rotatable wheel member which controls the extension of said strut, said wheel member having an irregularly shaped periphery, a lever pivoted at one end to one of said shoes, a detent formed on the free end of said lever to engage the periphery of said wheel member and produce rotation thereof, spring means secured between the lever and the other of said shoes to hold the ends of said shoes against said strut, said spring means further serving to pivot said lever and thereby turn said rotatable wheel member, means translating radially outward movement of said one shoe into displacement of said lever so that the detent of said lever engages a successive portion of the periphery of said wheel member, said spring means urging the lever to its original position to thereby adjustably rotate said rotary member when the brake is released and said one shoe is retracted.

3. In a brake having a primary shoe and a secondary shoe, an automatic adjuster for maintaining a predetermined brake clearance in accordance with the wear rate of said shoes, and comprising an extendible strut, a rotary serrated wheel connected with said strut to control extension of the strut determining the clearance between two of the adjacent ends of said brake shoes, a lever turnably supported on one of said shoes, a spring fastened between said lever and the other of said shoes to hold the shoe ends against said strut, said spring further serving to turn said lever and thus rotate said serrated wheel, and a flexible cable secured at one end and fastened to said lever at the other end, said cable having operative connection intermediate the ends thereof with one of said shoes whereby movement of said one shoe from a retracted position serves to tension the cable and displace said lever against the resistance of said spring, return of said one shoe to its retracted position permitting relaxing of said cable to enable said spring to return the lever which thereby operatively rotates the serrated wheel and adjustably extends the strut.

4. In a brake having primary and secondary brake shoes associated with a fixed anchor, an extendible strut interconnecting the adjacent ends of said shoes, a rotary member having an irregular shaped outer periphery operatively connected to said strut, said rotary member being turnable to control the length of said strut, a pawl turnably mounted on the articulated end of said secondary brake shoe and engageable with the outer periphery of said rotary member, a spring fastened between said pawl and the articulated end of said primary shoe to maintain the ends of said shoes in contact with said strut, a flexible cable fastened at one end to said pawl and held stationary at the other end, and a guide member operatively connected intermediate the ends of said cable, said guide member also having operative connection with said secondary shoe so that movement of said secondary shoe from its anchored position exerts tension in said cable, the pawl being thereafter turned by said spring when the cable is relaxed during brake release.

5. In a brake having two arcuate brake shoes each operatively connected to a fixed anchor at one end, an automatic adjuster for said shoes comprising an extendible member interconnecting the unanchored ends of said brake shoes, a rotary wheel having an irregularly shaped outer periphery operatively associated with said extendible member to control extension of said member, a pawl turnably mounted on one of said shoes and engageable with the irregularly shaped periphery of said wheel spring means fastened between said pawl and the other of said shoes to hold the shoe ends against said strut, said spring member also exerting force components to move said pawl laterally and to turn said pawl thus rotating said rotary wheel, a flexible cable connected at one end of said pawl and connected at its other end to said fixed anchor, and a guide member for said cable operatively connected to one of said shoes intermediate the ends thereof in such a way that movement of said one shoe from an anchored position exerts tension on the cable and turns said pawl against the resistance of said spring member, the return of said one shoe to its initial anchored position relieving the tension in said cable, thereby permitting said spring to return said pawl to its initial position and rotate the rotary wheel to adjust the brake.

6. An automatic adjuster in combination with a pair of brake shoes which are interconnected at one pair of adjacent ends through an elongatable strut having a rotary member with an irregularly shaped periphery, comprising an adjuster member, means for mounting said adjuster member for pivotal actuation and for movement with said brake shoes, a tooth at one end of said adjuster member contacting said rotary member and engageable with its irregular periphery to effect a driving connection therebetween, a spring operatively connected between said brake shoes to draw the two shoes together against said adjustable strut, means forming a connection between said adjuster member and spring and spaced from said first mounting means to provide a lever arm for the spring force effecting turning of the adjuster member on its pivot mounting and thereby rotating said rotary member through its driving connection with said tooth, and operating means secured to said adjuster member and to at least one of said shoes for operating the adjuster member responsively to radial shoe movement.

7. In a brake having articulated brake shoes, an extendible strut interconnecting said brake shoes, a rotary member having an irregularly shaped periphery, said rotary member being turnable to control the length of said strut, a lever, means for pivotally mounting said lever which is operatively carried by one of said brake shoes, a spring fastened between the other of said brake shoes and said lever and acting through its mounting means drawing the articulated ends of said shoes together and against said strut, a tooth portion of said lever engageable with the irregularly shaped periphery of said rotary member to form a driving connection therebetween, said spring being fastened to the lever to provide a spring force which is exerted along a line having a moment arm about said pivotal mounting means and of sufficient strength to effect a turning force thereon and extension of said strut, the line of said spring force also being laterally offset to bias said tooth against the rotary member and thereby maintaining said driving connection during rotation of said rotary member, and actuating means fastened to a portion of said lever and to at least one of said brake shoes to exert actuating turning force on said lever about said mounting means against the resistance of said spring when the shoes are expanded, the tooth portion of said lever being thereby moved into engagement with a successive irregulation of said rotary member, said spring being thereafter operative to return said lever to its original position and rotating said rotary member as the brake is released and the brake shoes are retracted.

8. In a brake having articulated primary and secondary brake shoes, an automatic adjuster comprising a lever, means for mounting said lever for pivotal movement on said secondary shoe, a spring stretched between and connected respectively with said primary shoe and the free end of said lever to act through said mounting means in drawing the articulated shoe ends together, an extendible strut provided with a rotary star wheel and interposed between and separating said shoe ends, said spring exerting its spring force on said lever along a line offset from the means for mounting the lever to provide a moment arm through which said spring force is effective for turning said lever and operating the rotary star wheel which extends said strut, said connections at the opposite ends of said spring with the primary shoe and lever respectively being laterally offset to provide an offset component of spring force for biasing a portion of said lever against the star wheel and maintaining a driving connection between said portion and star wheel, and operating means connected between said lever and at least one of said shoes and a relatively fixed portion of said brake to pivot the lever arm on its mounting means against the resistance of said spring as the brake shoes are expanded.

9. In a brake having two juxtaposed brake shoes, an automatic adjuster comprising extendible means received between adjacent ends of said shoes to vary the displacement between the shoe ends and thereby obtain radial shoe adjustment, an operating member having an irregularly shaped portion and operative to control the extension of said means, a lever, means for mounting said lever for turning movement and operatively carried by one of said brake shoes, said lever including a tooth in engagement with the irregularly shaped portion of said operating member to form a driving connection therewith, a resilient member connected to at least one of said brake shoes and bearing against said lever to effect returning of the lever to its original position following each application of the brakes, means for positioning said spring to provide a spring force along a line developing a lateral force component on the lever to maintain a driving engagement between the tooth and irregularly shaped portion of said operating member, and means operatively connected to said lever, to a fixed portion of the brake and to at least one of said shoes to move said tooth into engagement with a successive portion of said operating member responsively to radial actuation of said shoes.

References Cited in the file of this patent

UNITED STATES PATENTS

| 1,954,540 | Sanford | Apr. 10, 1934 |
| 2,060,429 | Smith | Nov. 10, 1936 |

FOREIGN PATENTS

| 766,811 | France | Apr. 23, 1934 |

OTHER REFERENCES

Publication: Automotive Industries, April 25, 1936, page 605.